Dec. 2, 1958 — A. R. FORSBERG — 2,862,511
APPARATUS FOR LIQUID TREATMENT OF GRANULAR MATERIAL
Filed March 20, 1956
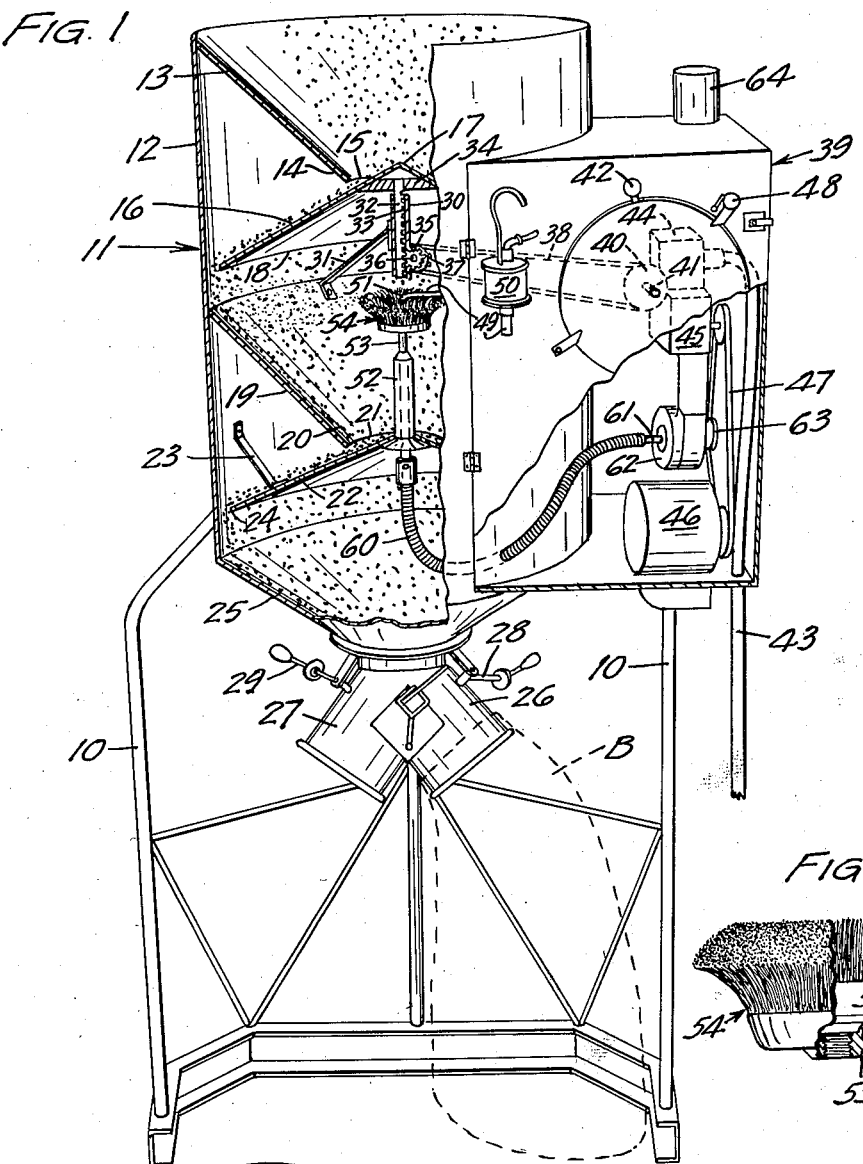
FIG. 1
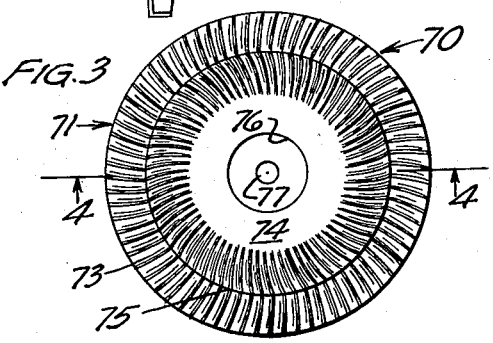
FIG. 3
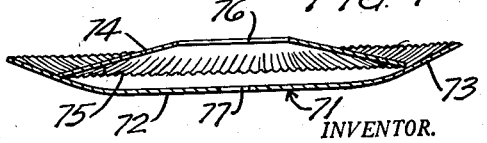
FIG. 2
FIG. 4
INVENTOR.
ARTHUR R. FORSBERG
BY
Williamson, Schroeder, Adams & Meyers
ATTORNEYS United States Patent Office 2,862,511
Patented Dec. 2, 1958

2,862,511

APPARATUS FOR LIQUID TREATMENT OF GRANULAR MATERIAL

Arthur R. Forsberg, Thief River Falls, Minn.

Application March 20, 1956, Serial No. 572,653

3 Claims. (Cl. 134—183)

This invention relates to apparatus for treating granular material with a liquid and more specifically relates to apparatus for applying small quantities of liquid to granular material such as seeds and the like.

An object of my invention is to provide a new and improved apparatus of simple and inexpensive construction and operation for applying liquid to granular material such as seeds and the like.

Another object of my invention is the provision of novel apparatus which may be easily and readily controlled to thoroughly treat a granular material with a uniform and desired quantity of liquid.

Still another object of my invention is to provide novel apparatus for directing misted liquid and turbulent air into free-falling granular material and to simultaneously apply the liquid and agitate the material to facilitate thorough treating of all of the granular material.

A further object of my invention is to provide apparatus for forming a continuous curtain of free-falling granular material having a controlled mass rate of flow and for continuously directing at a controlled rate a misted liquid and turbulent air into the whole curtain to agitate and thoroughly treat a granular material.

These and other objects and advantages of the invention will more fully appear from the following description, made in connection with the accompanying drawings, wherein like reference characters refer to the same parts throughout the several views and in which:

Fig. 1 is a perspective view of the invention with portions thereof being broken away;

Fig. 2 is an elevation detail view of a portion of the invention which is partly broken away for clarity;

Fig. 3 is a top plan detail view of a modified form of the invention; and

Fig. 4 is a detail vertical detail section view taken on a plane as indicated substantially at 4—4 of Fig. 3.

One form of the present invention is shown in Figs. 1 and 2 and is described herein. The invention comprises apparatus for treating granular material such as seeds with small quantities of a liquid. The invention is provided with a frame or supporting structure 10 and a substantially cylindrical upstanding housing indicated in general by numeral 11 having a continuous sidewall 12. Material-carrying delivery means are provided in the upper portion of the housing 11 and in the form shown such means include a hopper 13 having a depending delivery portion 14 with an annular bottom edge 15 which defines a substantially circular discharge opening.

Means are provided for receiving and controlling the flow of material from the lower delivery portion 14 of hopper 13. In the form shown, a substantially conical material spreader or plate 16 is mounted beneath the hopper 13 for vertical movement and has an upstaanding apex portion 17 which is disposed in alignment with the delivery opening of hopper 13. The apex portion 17 is disposed in close proximity with the annular edge 15 of hopper 13 and is vertically shiftable toward and away therefrom. The annular edge 14 and the upstanding apex portion 17 of the conical spreader 16 cooperatively define a granular material flow controlling valve which regulates the quantity of granular material permitted to flow downwardly over the spreader 16. The spreader 16 has a lower annular edge portion 18 which is disposed in radially spaced position from the inner surface of the continuous housing wall 12 to permit granular material to flow therebetween.

Means are provided for receiving and thoroughly mixing the granular material from the annular edge portion 18 of the conical material spreader 16. In the form shown, a truncated cone or funnel 19 is affixed at its upper peripheral edge to the continuous side wall 12 of housing 11 and has a diminished lower portion 20 which defines a lower annular edge 21 to provide a discharge opening. Another substantially conical spreader or distributor 22 is mounted on housing 11 by suitable means such as brackets 23 for receiving the falling granular material from the lower edge opening of the funnel 19. The lower annular edge 24 of spreader 22 is spaced from the continuous side wall 12 of housing 11 to permit granular material to flow and fall downwardly therebetween.

Housing 11 is provided with an inwardly and downwardly tapering hopper bottom 25 which communicates with a pair of discharge spouts 26 and 27, the granular material discharge through which are controlled by handles 28 and 29 respectively which operate flow valves set upon the floor and the open mouths thereof may be set upon the floor and the open mouths theerof may be positioned in encircling relation with respect to spouts 27 and 28 to be filled therefrom.

Means are provided for mounting spreader 16 for vertical movement. In the form shown, such means include a vertically disposed mounting sleeve 30 which may be substantially square in cross section and which is supported beneath spreader 16 from funnel 19 by means of brackets 31. An upstanding mounting post 32 having teeth 33 formed along one side thereof is vertically slidably carried in sleeve 30. Post 32 may be substantially square in cross section to conform to the shape of sleeve 30 and thereby restrict rotation of shaft 32 in sleeve 30. The upper portion of the mounting post 32 is secured to a mounting plate 34 which may be affixed as by welding to the apex portion 17 of conical spreader 16.

Means are provided for vertically adjusting the mounting post 32 and spreader 16 and in the form shown, a cogwheel or gear 35 is meshed with teeth 33 on post 32, and is keyed to shaft 36 which is carried on sleeve 30 in suitable bearings. A sprocket 37 is also keyed to shaft 36 for controlling the rotation of gear 35 and a roller chain 38 is trained over sprocket 37 for rotating the same. The roller chain 38 extends through suitably provided apertures in side wall 12 and into the control box indicated in general by numeral 39. Chain 38 is trained over another sprocket 40 which is keyed to a mounting shaft 41. A hand control 42 is also connected with shaft 41 for rotating the same and thereby vertically adjusting the position of mounting post 32 and conical spreader 16.

Means are provided for applying at a uniform rate, a desired quantity of liquid to the falling granular material or seeds as they fall over the lower annular edge 18 of spreader 16 in a substantially continuous annular curtain. In the form shown, such means include a source of liquid which may be provided through hose 43 into the control box 39 and thence into a controllable pump 44. Pump 44 is of a conventional type, being operable over a wide speed range so as to vary the quantity of liquid pumped thereby. Pump 44 is provided with a gear changer 45 for controlling the speed of operation thereof.

A source of rotary power such as motor 46 is connected by a belt 47 to the gear changer 45 for supplying rotary power to the pump 44. Gear changer 45 is controlled by a hand control 48 on the exterior of control box 39. Liquid communication is provided by pipe 49 through a sight glass 50 into the interior of housing 11 and the discharge nozzle 51. Pipe 49 is directed downwardly at a position immediately beneath the conical spreader 16. Means are provided for receiving the stream of liquid discharged from flow nozzle 51 and continuously distributing the liquid outwardly in multi-directions toward the continuous curtain of free falling granular material. In the form shown, a bearing 52 is affixed to the apex portion of spreader 22 in upstanding relation and has a rotary shaft 53 carried therein. A rotary impeller indicated in general by numeral 54 is affixed to the upper end of rotary shaft 53 to be driven thereby. The rotary impeller 54 is best seen in Fig. 2 and has a mounting hub 55, an outer bristle retaining plate 56 and an inner receptacle-forming bristle retaining plate 57 carried by hub 55. Impeller 54 is provided with a plurality of radially outwardly and upwardly inclined flow guides which, in the present form of the invention, comprise brush bristles constructed of metallic threads or wire. It will be seen that the bristles 58 are in liquid flow communication with the upper overflow edge portion 59 of the liquid receptacle. As best seen in Fig. 1 the impeller 54 is carried on rotary shaft 53, the upper portion of which is threadably mounted in hub 55 so as to provide a liquid-carrying open topped receptacle in the central portion of the impeller. The discharge portion 51 of pipe 49 is disposed immediately above the receptacle 57 to discharge a stream of liquid thereinto.

A rotary shaft 53 is connected to a flexible drive shaft 60 which is connected to shaft 61 of blower 62 and which is driven by belt 47 trained over pulley 63 which is keyed to shaft 61. The blower 62 is provided for discharging gases from the interior of control housing 39 and has a discharge connected to an exhaust outlet pipe 64 which may be connected by suitable means to an exhaust system in the plant.

In the form of the invention shown in Figs. 3 and 4, a rotary impeller indicated in general by numeral 70 is provided for replacing the impeller 54 to operate substantially in the same manner. The impeller 70 comprises a substantially circular disc 71 having a horizontal central and lower portion 72 and also having an upwardly inclined and radially fluted outer edge portion 73. The substantially radial fluting in the inclined outer portion 73 of disc 71 is formed by corrugating the disc 71 and the radial fluting provides substantially radially extending liquid flow guides. Another annular disc 74 is affixed at its outer edge portion 75 to the disc 71 and has an enlarged central opening 76 for receiving the stream of liquid thereinto. The annular disc 74 is also radially fluted, as best seen in Fig. 3. A mounting aperature 77 is provided in the central portion of base 72 to receive mounting shaft 53 thereon to be secured as by a nut.

Operation

In the operation of the granular material treating apparatus as seen in Fig. 1, the motor 46 drives pump 44 to cause a stream of liquid to flow through pipe 49 and onto impeller 54, and impeller 54 is also rotated by motor 46. Granular material such as seeds is fed into the hopper 13 and the granular material is discharged downwardly through the bottom delivery opening thereof onto the conical spreader 16. The rate of flow of the granular material is controlled by the size of the opening between the lower annular edge 15 of hopper 13 and the upwardly extending apex portion 17 of the conical spreader. This rate of flow of granular material may be controlled by adjusting the vertical position of spreader 16. A continuous annular curtain of free falling granular material moves downwardly from the lower annular edge 18 of spreader 16 into the mixing funnel 19.

Liquid is supplied through the discharge 51 of pipe 49 into the liquid receptacle 57 of the rapidly revolving impeller 54. As the liquid overflows the upper edge 59 of the receptacle 57, the liquid is impelled by centrifugal force along the flow guides or bristles 58 radially outwardly. The construction of the impeller, along with the high rotary speed thereof (it has been found that a speed of approximately 2500 R. P. M. is satisfactory), combine to cause the liquid to be discharged in a finely misted condition toward the continuous curtain of free falling granular material. The rate at which liquid is impelled into the curtain of granular material is controlled by the rate at which liquid is supplied into the receptacle 57 and this is controlled by operation of the gear changer 45 to vary the speed at which pump 44 operates.

Impeller 54 also circulates the air in the area beneath spreader 16 and causes the air to move at high speed radially outwardly from the bristles 58 so as to cause application of turbulently moving air to the curtain of free falling granular material simultaneously with the application of misted liquid thereto. The free falling granular material in the continuous curtain is thereby thoroughly agitated by the air as the liquid is applied thereto causing all of the granular material to be thoroughly treated with the liquid.

The granular material is thereafter collected in the collecting funnel 19 and is thereafter spread over the conical spreader 22 again. The granular material is then discharged and collected again in the hopper bottom 25 of housing 19. By the successive collecting and spreading and collecting again in the lower portion of housing 11, the granular material is thoroughly mixed together so as to provide a uniform free flowing granular mass of thoroughly treated material which may be fed directly into bags through the bagging spouts 26 and 27.

It should be noted that the flow of granular material may be completely stopped by shifting the conical spreader 16 upwardly into engagement with the lower annular edge 15 of hopper 13. By lowering the spreader 16 to various positions, the mass rate of flow of granular material flowing through the treating apparatus may be varied over an extremely wide range. In addition, the flow of liquid may be controlled over a substantial range by operation of gear changer 45 which controls the operation of pump 44. The quantity of liquid applied to granular material may be varied over an extremely wide range by cooperative controlling of the mass rate of flow of granular material and the rate of flow of treating liquid from pump 44.

When the impeller 70 is used in applying liquid to the curtain of free falling granular material in place of impeller 54, the operation is substantially identical to that previously described. Liquid is supplied downwardly through aperture 76 of annular disc 74 into the receptacle defined between disc 74 and the bottom portion 72 of disc 71. As the liquid overflows the inner annular edge of disc 74, the liquid is rapidly impelled by centrifugal force along the radially fluted discs 74 and 71 and thence substantially radially outwardly from impeller 70 to the free falling curtain of granular material. The fluting in the discs causes the liquid to be broken into finely misted condition. In this form of the invention the impeller 70 also causes air to be circulated outwardly toward the free falling curtain of granular material.

It will be seen that I have provided a new and improved apparatus for uniformly and continuously applying a treating liquid to a continuous curtain of free falling granular material, the mass rate of flow of which may be readily and easily controlled to regulate the quantity of liquid applied thereto.

It will also be noted that I have provided a new and improved apparatus for the liquid treatment of granular material which permits the relative proportions of liquid and granular material to be varied over extremely wide ranges by controlling the mass rate of flow of granular material and also controlling the quantity of liquid applied.

It will also be apparent that I have provided in granular material treating apparatus for the formation of a continuous and substantially annular curtain of free falling granular material to which is continuously and uniformly applied from the inner side of the annular curtain, misted treating liquid from an impeller which continuously directs misted liquid in multi-directions.

It should also be noted that I have provided in granular material treating apparatus wherein the granular material to be treated falls in a continuous curtain, a rotary impeller carrying a quantity of liquid in an open-topped receptacle, the liquid overflow from which is guided and impelled radially outwardly in finely misted condition to the curtain of free falling granular material.

It will, of course, be understood that various changes may be made in the form, details, arrangement and proportions of the parts without departing from the scope of my invention.

What is claimed is:

1. Apparatus for treating granular material with a liquid, comprising a hopper having a lower delivery opening, a substantial conical material spreader having an upwardly extending apex portion disposed in vertical alignment with said delivery opening and directing granular material in multi-directions, said conical spreader having a lower and outer peripheral edge over which the the granular material flows in a substantially continuous curtain, a radially-bristled rotary brush positioned inwardly of and adjacent to said spreader peripheral edge and journalled on a vertical axis, and conduit means directing the treating liquid centrally onto said brush, said brush impelling by centrifugal force the liquid in finely misted condition outwardly into engagement with the curtain of granular material, and said brush circulating air outwardly to agitate the granular material to facilitate thorough liquid treating thereof.

2. Apparatus for treating granular material with a liquid, comprising a housing, material-carrying means delivering granular material into the upper portion of the housing, distributing means within the housing and receiving and directing the granular material outwardly in multi-directions, said distributing means being constructed and arranged to form a free-falling continuous curtain of granular material, a rotary impeller mounted on a vertical axis within the housing and disposed below said distributing means and inwardly of the continuous curtain of free-falling material, said impeller having an open-topped liquid-carrying receptacle disposed centrally thereof and also having a plurality of bristles extending generally radially outwardly from said receptacle and in liquid flow communication with the open top thereof to receive liquid overflow therefrom and impel by centrifugal force the liquid in misted condition outwardly into engagement with the continuous curtain of granular material, and conduit means directing the treating liquid into said receptacle, whereby the bristles impel misted liquid and air outwardly into engagement with the curtain of falling material for thoroughly treating and agitating the same.

3. Apparatus for treating granular material with a liquid comprising a housing, material-carrying means delivering granular material into the upper portion of the housing, distributing means within the housing and receiving and directing the granular material outwardly in multi-directions, said distributing means being constructed and arranged to form a free-falling continuous curtain of grenular material, a radially-bristled rotary brush mounted on a vertical axis within the housing and disposed below said distributing means and inwardly of the continuous curtain of granular material, and conduit means directing the treating liquid onto said brush, whereby misted treating liquid and air are impelled outwardly by the brush for thoroughly treating and agitating the free-falling curtain of granular material.

References Cited in the file of this patent

UNITED STATES PATENTS

| | | |
|---|---|---|
| 1,383,921 | Fredel et al. | July 5, 1921 |
| 1,853,682 | Hechenbleinkner | Apr. 12, 1932 |
| 1,855,548 | Forster | Apr. 26, 1932 |
| 2,146,776 | Strominger | Feb. 14, 1939 |
| 2,319,865 | James | May 25, 1943 |